Figure 9:
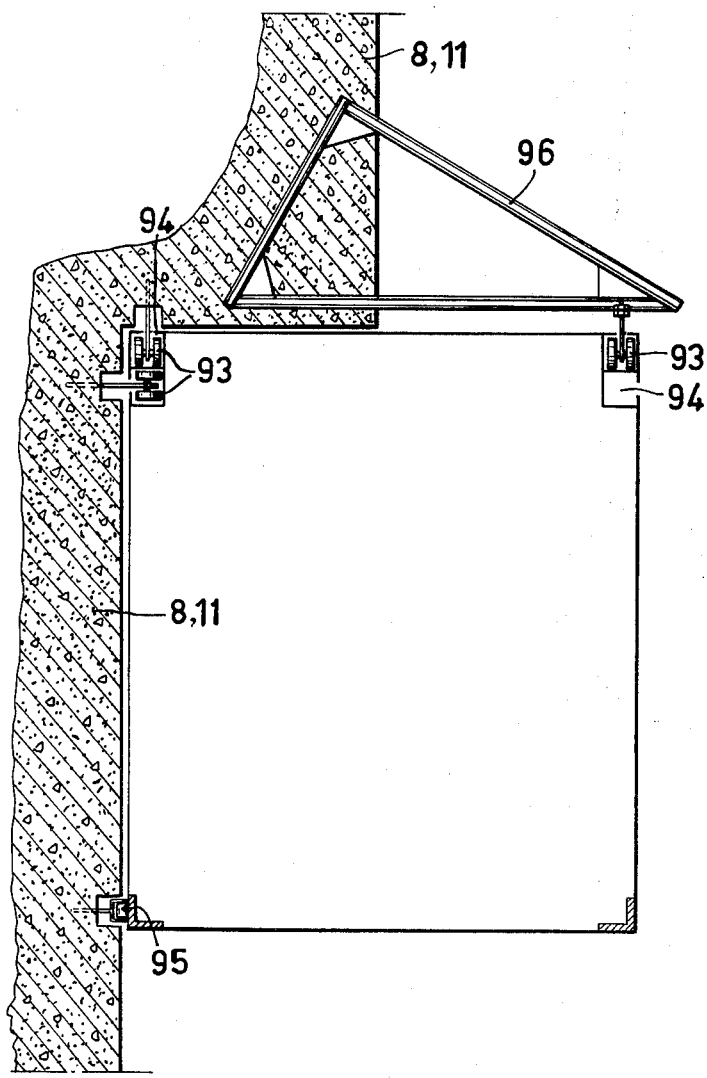

Oct. 12, 1965         E. G. V. HEROLF                3,210,903
       METHOD OF ERECTING BUILDING CONSTRUCTIONS AND MEANS
                   FOR CARRYING OUT THE METHOD
Filed May 2, 1961                              15 Sheets-Sheet 1
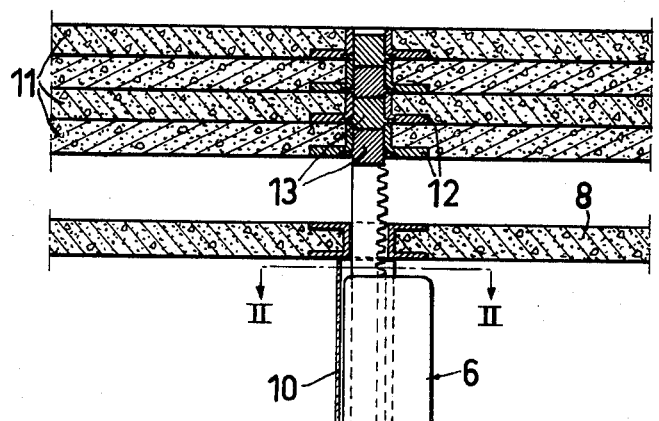
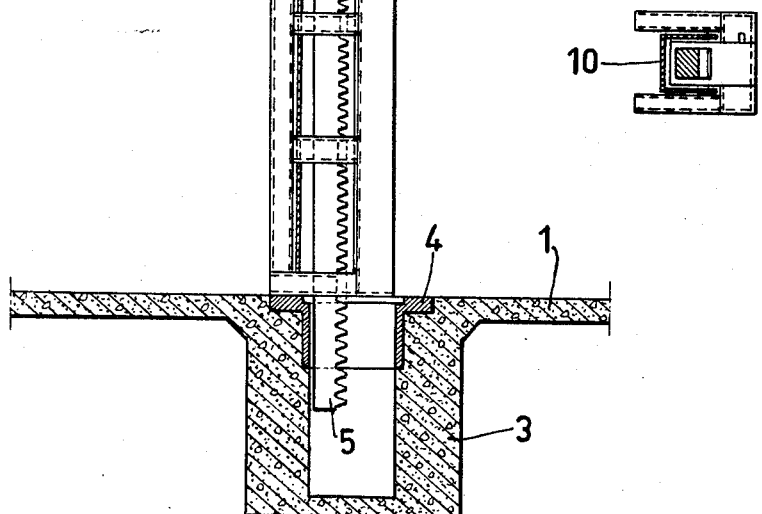
INVENTOR.
ERIK GÖSTA VILHELM HEROLF
BY
ATTORNEY

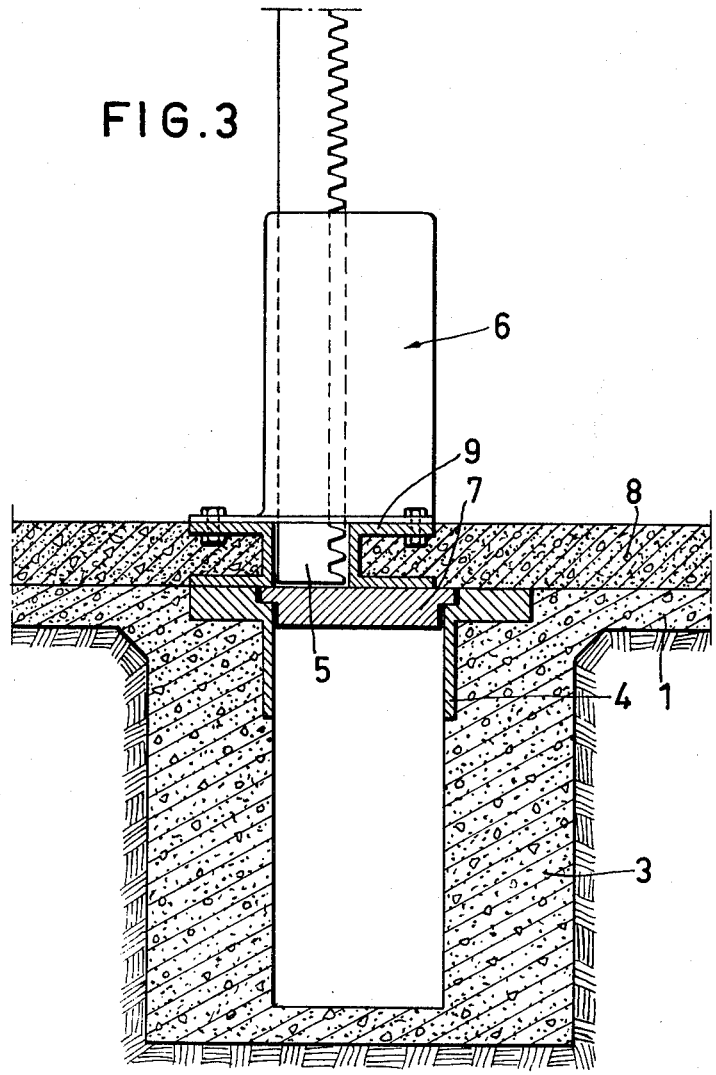

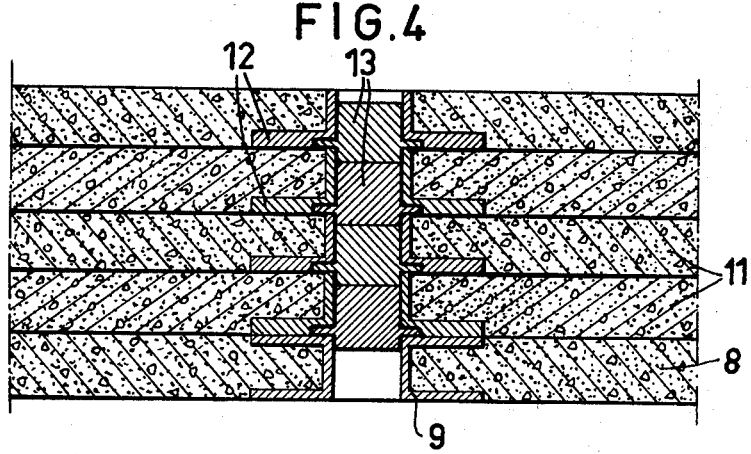
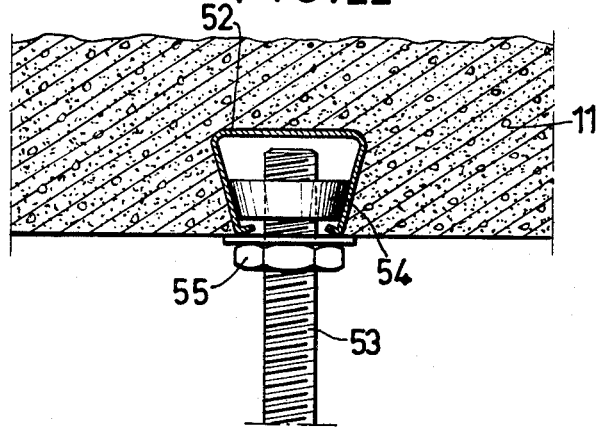

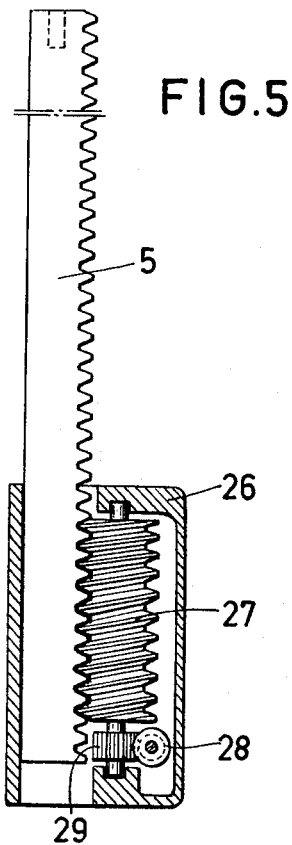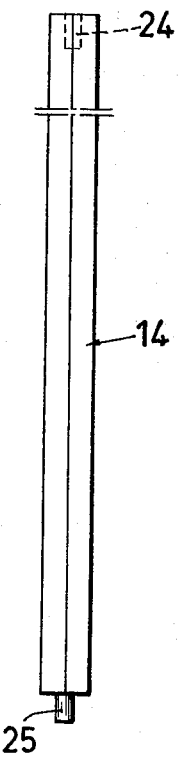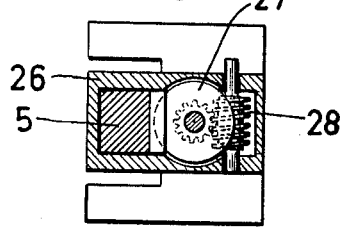

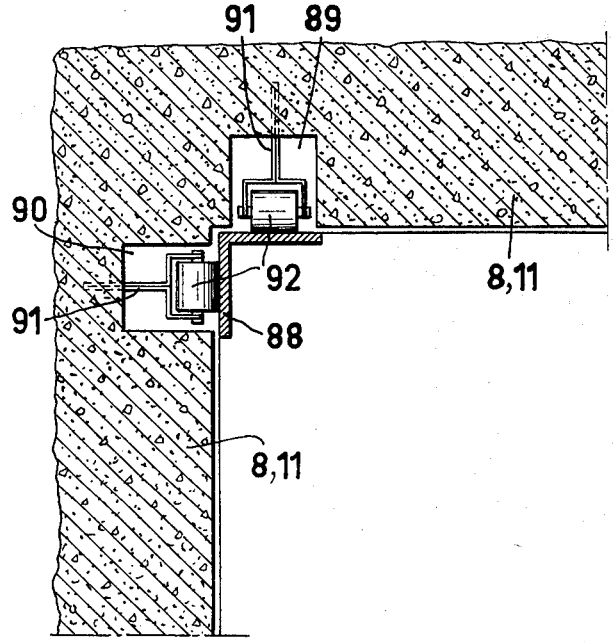

Oct. 12, 1965   E. G. V. HEROLF   3,210,903
METHOD OF ERECTING BUILDING CONSTRUCTIONS AND MEANS
FOR CARRYING OUT THE METHOD
Filed May 2, 1961   15 Sheets-Sheet 9

Oct. 12, 1965 E. G. V. HEROLF 3,210,903
METHOD OF ERECTING BUILDING CONSTRUCTIONS AND MEANS
FOR CARRYING OUT THE METHOD
Filed May 2, 1961 15 Sheets-Sheet 11

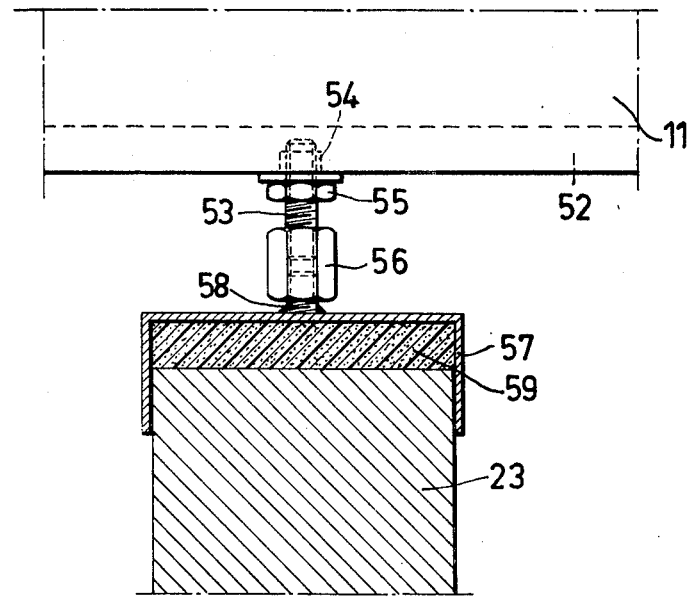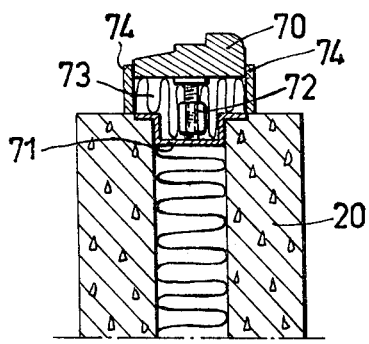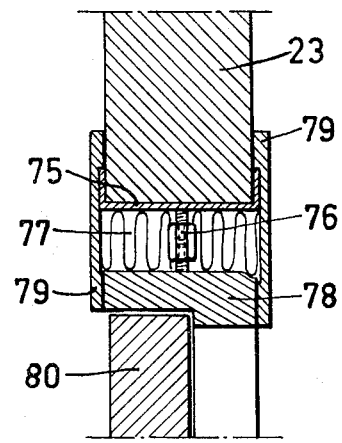

United States Patent Office 3,210,903
Patented Oct. 12, 1965

3,210,903
METHOD OF ERECTING BUILDING CONSTRUCTIONS AND MEANS FOR CARRYING OUT THE METHOD
Erik G. V. Herolf, 10 Bankgatan, Sundsvall, Sweden
Filed May 2, 1961, Ser. No. 107,255
Claims priority, application Sweden, May 7, 1960, 4,552/60
4 Claims. (Cl. 52—745)

This invention relates to a method of erecting houses and other building constructions by lifting the floors and assembling prefabricated building elements. The invention relates further to a building construction erected according to this method and comprises also means, such as lifting means, transport crates for wall elements and carts adapted for this purpose.

The method according to the invention is substantially characterized in that it comprises the steps of preparing a basement ceiling on a basement floor which is finish-ground and provided with foundations and plinths, to lift the basement ceiling by lifting means mounted in the foundations to a level somewhat above the final level of the said ceiling, to insert pillars and to lower the said ceiling into final position, to move the lifting means downwards into the basement, to cast the desired number of floors on the said ceiling, to lift all of the said floors to such a level, that the lowermost floor of the floors being lifted is somewhat above the final level of the next story, to erect pillars and to lower the said floors to the final level of the lowermost one, to provide the lifting means with extension rods insertible through recesses in the floors, whereafter the said process is repeated in an analogous manner with the remaining floors until each floor is in its final position, in such a manner that, after each floor is fixed in its final position, external and internal wall elements are advanced to their places of assembly by means of special carts and assembled in their final positions.

According to previously known methods, the construction parts were lifted from the ground plane by various types of lifting means such, that the lifting occurred in step with the completion of the structures, the uppermost parts of the construction being prepared first, in such a manner, that the roof and the attic floor are prepared on the ground and lifted one story, whereafter the uppermost story, was prepared and lifted one story, also. These methods were not applied to a greater extent, owing to the relatively heavy loads to be lifted. The advantage gained by preparing the structure entirely on the ground, is compensated by the disadvantage that a great number of working processes within the construction must be carried out by a less suitable mode of procedure.

There further exists a German patent for lifting floors, wherein the lifting is carried out in such a manner, that hollow columns are erected on the base and provided with wires running via return pulleys both downwards and upwards in such a manner, that the wires run from a capstan common for several columns upwards through the columns and outwardly downwards from the top to floors cast with holes for the columns and said lifting wires. All floors are cast in a pile of floors such that they are spaced from and do not adhere to one another. When all floors were cast and show sufficient strength, they are lifted in such a manner, that first the uppermost floor is lifted to its final level, whereafter the other floors are lifted in turn to their respective final levels. After their lifting, the floors are secured to the columns.

The aforesaid method includes the disadvantage that, prior to the securing of all floors in their positions, the portion of the columns where buckling may occur is of considerable length, and that for preventing such buckling the columns must be overdimensioned. It further is necessary, that the columns must have equal outer diameter along their entire length, which renders it impossible to make an effective use of the column material in the completed construction. As another difficulty of the said method must be mentioned that, before the floors are lifted and positioned, the columns need securing by lateral stays. Finally, owing to the columns a rational casting of the floors is rendered impossible. The said method does, however, not appear to be in use to a greater extent, in view of the disadvantages mentioned.

There exists, moreover, an American method of lifting floors, which is very similar to the German method. According to the American method, columns which are held in vertical position by means of sloping stays attached to the tops, are erected on a base, the columns having equal outer diameter along their entire extension. About the columns are fixed collars including holes for the columns as well as two holes located diametrically for inserting lifting means of the screw type. The said collars are placed above one another, corresponding in number to the number of floors to be laid in the building. As in the aforesaid German method, floors of concrete are cast about the collars such, that the floors are spaced from one another. The floors are then lifted by means of screws operating through the lateral holes in the collars, the uppermost floor being lifted first. Contrary to the German method, the floors are lifted by steps such, that prior to their lifting all the way up, the underlying floors located at a suitable distance from one another provide lateral support to the columns. When the lifting of the floors is completed, the vertical load is transferred to the columns proper. Even this method includes the disadvantage mentioned in connection with the German patent, namely, that the columns do not permit the rational casting method which could be applied if the floor surface would be entirely free of columns. Moreover, owing to the fact that the columns must be of equal dimension along their entire length, the columns are overdimensioned in the upper stories.

The method according to the present invention for erecting houses and other building structures and the means used in connection therewith render a plurality of essential advantages compared with the conventional methods. For example, the pillars are entirely independent of one another and are mounted storywise. The collars according to the aforesaid American method, for example, are of a considerably more complicated construction. By the method according to the invention, the stoppers, jacks, guide pulleys etc. can be applied to a subsequent erection of a great number of buildings, so that the costs of such equipment per building will be reduced considerably.

While the American method permits only a rather low lifting rate, the lifting according to the invention can be carried out at a rate of about one story per hour, thanks to the fact that as soon as one floor was lifted, the method according to the invention renders a definite guidance of the structure possible. Moreover, there is no longer any risk of collapse and catastrophes resulting thereof, which occurred with previously known methods owing to the inclined position of the columns.

As a further advantage of the invention, compared, for example, with the aforesaid American method, can be mentioned, that after an optional time interval the screw jacks can be reestablished in the basement when, for example, the basement story is to be re-constructed or be given a greater height. In such a case, the procedure is as follows. The basement story is evacuated and the part of the building above the basement story is lifted by means of screw jacks, whereafter the pillars are removed and replaced by pillars of a greater length in the basement story. In the event, that an entire building is to be re-constructed, only the bearing structure can be maintained. In such a case, it is even possible to cast new floors above the uppermost one while maintaining the previous floors.

The invention will be described in greater detail in the following, reference being had to the accompanying drawings showing both the method and various means for carrying out the method.

Figure 10:
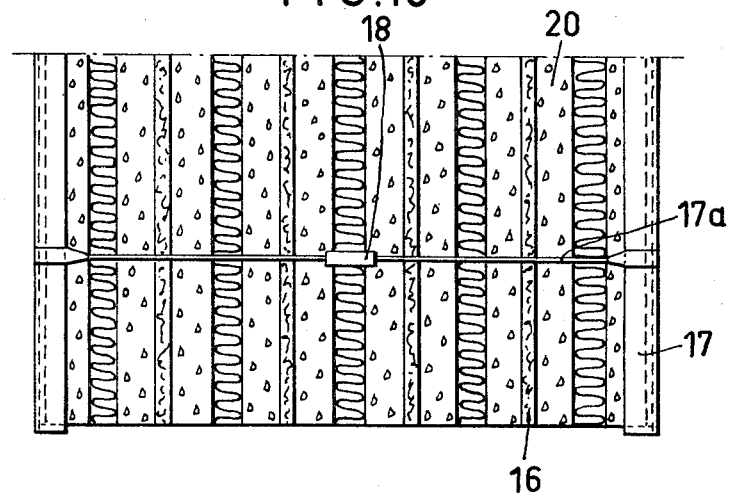
Figure 11:
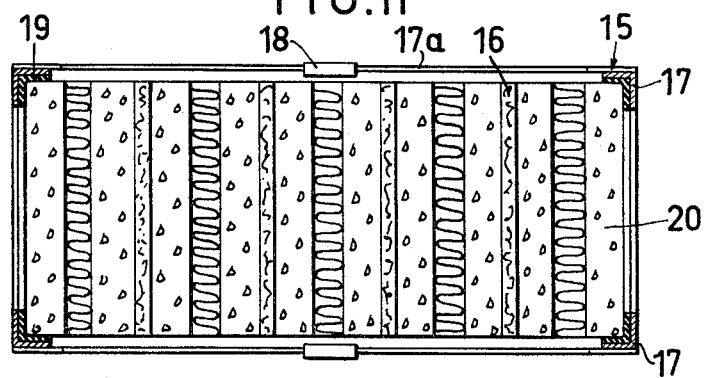
Figure 12:
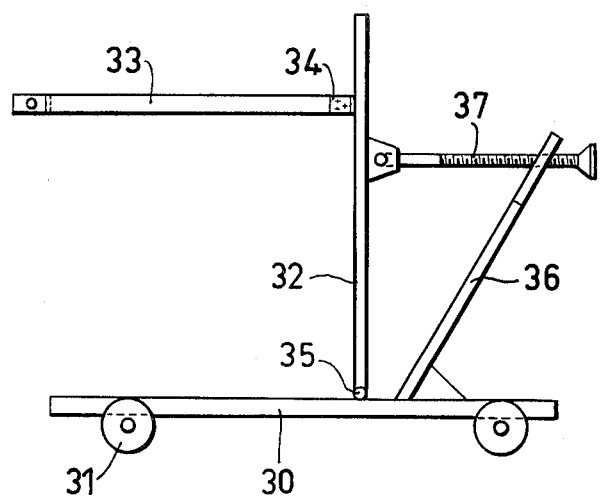
Figure 13:
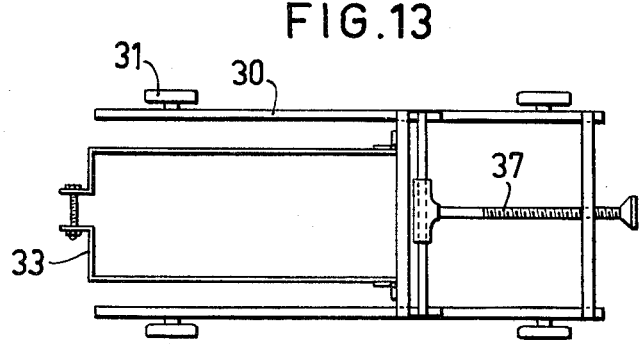
Figure 14:
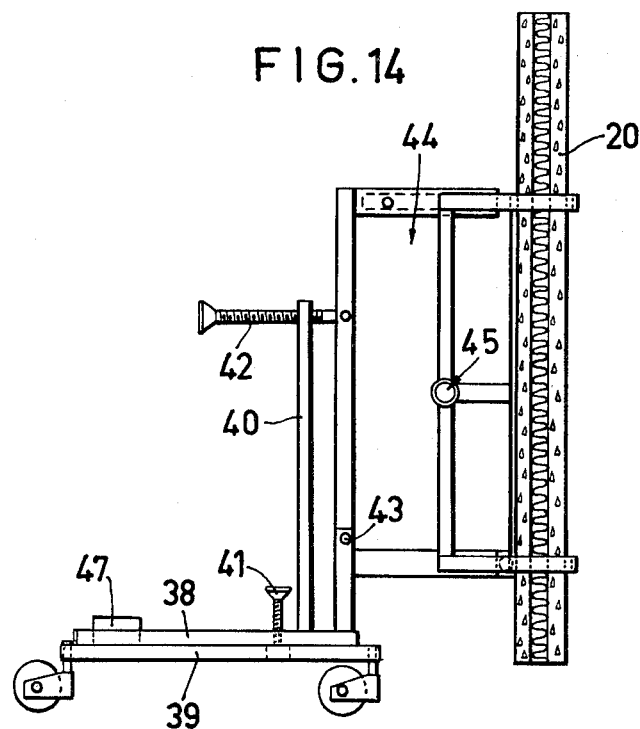
Figure 15:
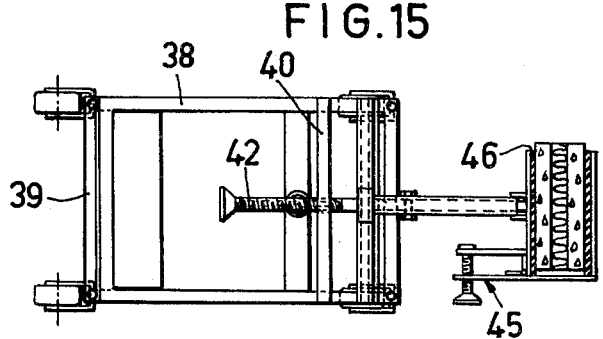
Figure 16:
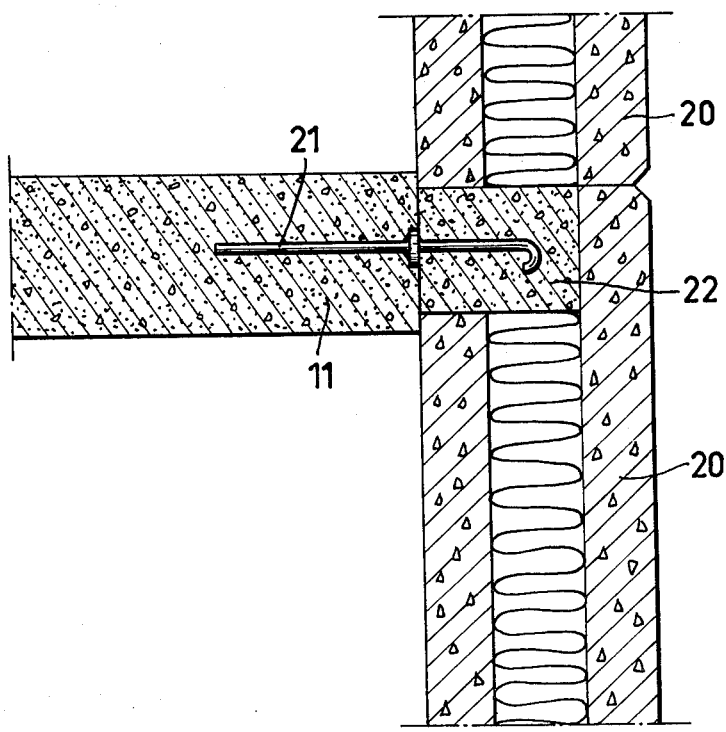
Figure 17:
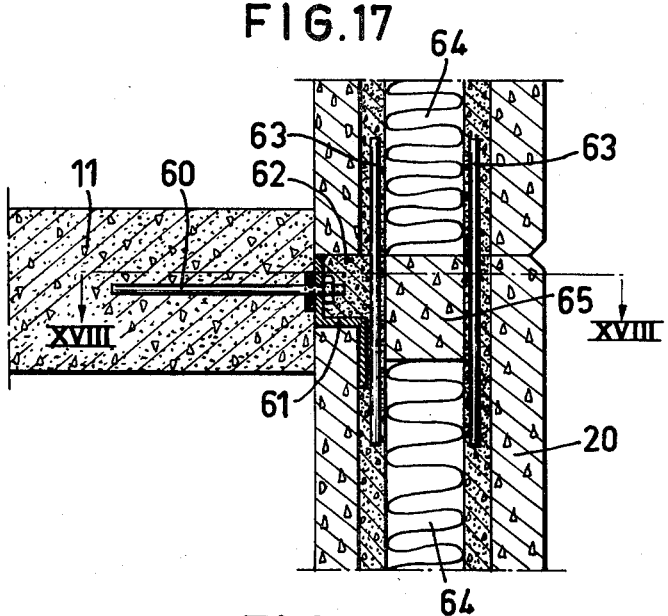
Figure 18:
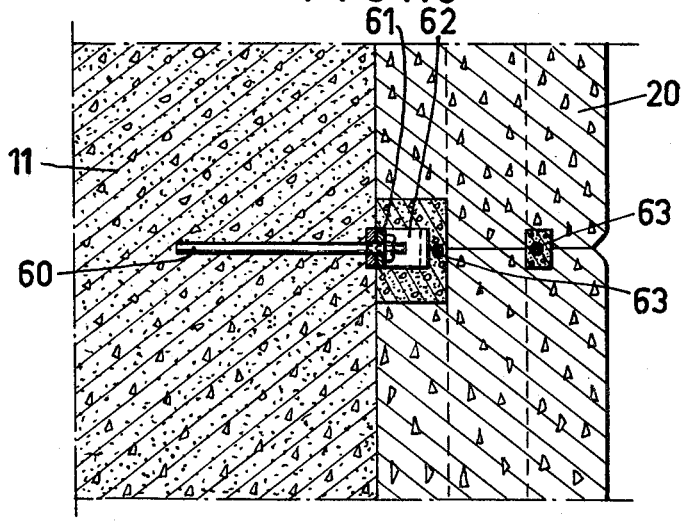
Figure 19:
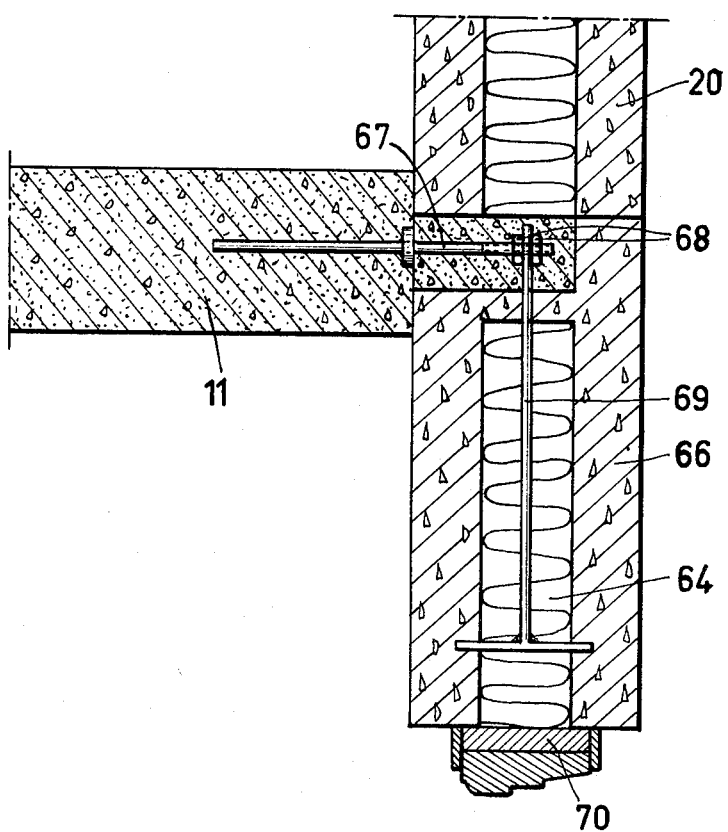
Figure 23:
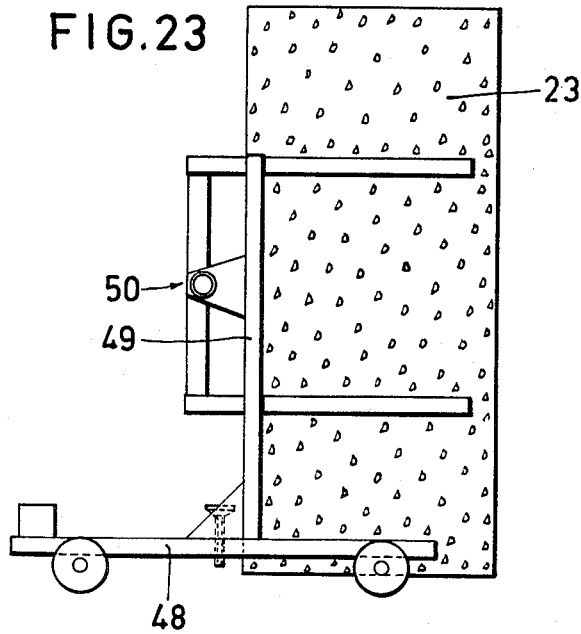
Figure 24:
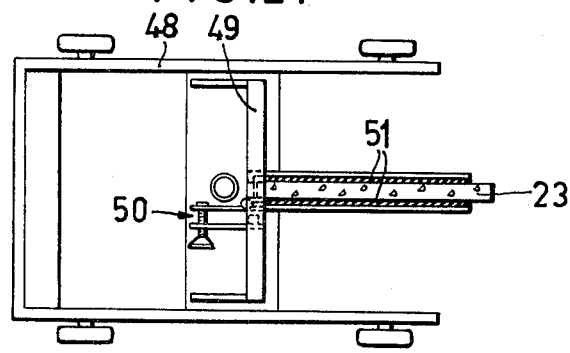
Figure 26:
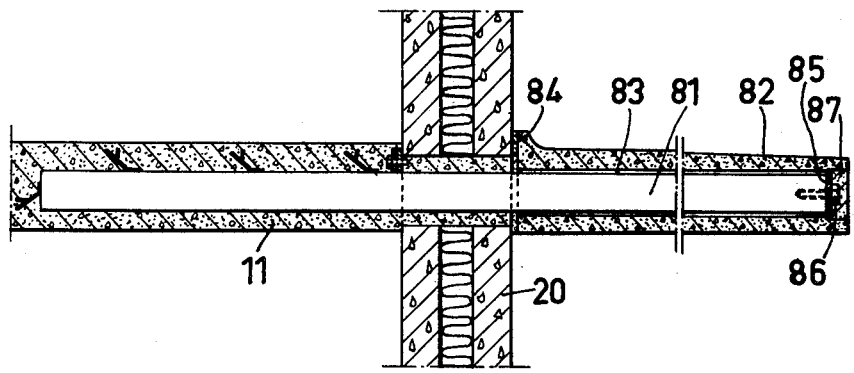
Figure 27:
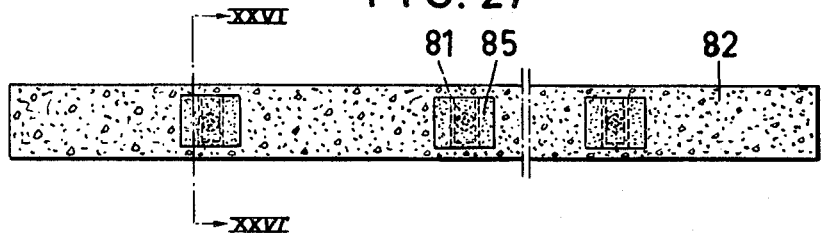

FIG. 1 shows the lifting of floors located above the basement ceiling, FIG. 2 is a section along the line II—II in FIG. 1, FIG. 3 shows the various elements of the basement floor and the ground, FIG. 4 shows elements for floors above the basement story, FIG. 5 shows a sectional side view of lifting means, FIG. 6 shows the stand for the lifting means, FIG. 7 shows an extension rod for the lifting means, FIG. 8 shows the lateral guidance of floors along the structure in holes for the staircase, FIG. 9 illustrates a method of guiding a floor during the lifting of the same, FIG. 10 shows a transport crate for wall elements seen from the side, FIG. 11 shows the same crate seen from above, FIGS. 12 and 13 show a cart for transporting lightweight concrete elements seen from the side and from above respectively, FIGS. 14 and 15 show a cart for the assembly of wall elements seen from the side and from above respectively, FIG. 16 shows the fastening of outer walls to the floors, FIG. 17 shows an alternative embodiment of fastening outer walls to floors, FIG. 18 is a section along the line XVIII—XVIII in FIG. 17, FIG. 19 illustrates a method for mounting a lintel, FIG. 20 shows a method of mounting windows, FIG. 21 illustrates a method for securing partition walls to a floor, FIG. 22 shows on an enlarged scale a detail of the fastening in the floor according to FIG. 21, FIGS. 23 and 24 show a cart for internal lightweight concrete elements seen from the side and from above respectively, FIG. 25 shows the mounting of doors in a partition wall, FIG. 26 shows the mounting of a balcony to a floor in a section along the line XXVI—XXVI in FIG. 27, and FIG. 27 shows a front view of the balcony.

After the foundations and plinths for the building construction are cast and constructed in conventional manner, the basement floor 1 is cast and steel-ground, so that the entire base surface for the construction will be smooth and accurately levelled. The floors comprised in the construction are to be supported on iron pillars, beneath each of which steel collars 4 of the shape shown in FIGS. 1 and 3 are cast in the foundations 3. The said foundations 3 carry the load of the building construction. The steel collars 4 are provided with a square hole for receiving a rack lifting rod 5 of a lifting means 6 which will be described later on in this specification. The depth of the foundation 3 is such, that the rack 5 with its lower end will not contact the bottom when the upper end of the rack is at a height equal to the lower edge of the basement ceiling in mounted position. In the collar 4, there must be space for inserting a stopper 7 which is removed upwardly after the floor next above the collar is lifted. On the basement floor is mounted an iron structure in the place of the staircase to be constructed, the said structure being anchored in the ground and by means of tension cross-bars given an exact vertical surface in the corners. The said structure is given a height extending to the upper edge of the attic floor, and it should be capable of taking up all lateral forces which may be produced in the building structure in its assembled state. The lateral forces of the completed construction may possibly also be taken up by the said iron structure.

On the steel-ground surface constituting the basement floor 1, a floor slab 8 is cast which, when lifted, constitutes the basement ceiling. The said floor slab is provided with collars 9 which at the same time serve as fastening for the cast concrete slab and are designed in principle as shown in FIGS. 1 and 3. As in the case of the basement floor, also the upper surface of the basement ceiling is steel-ground. The floor is provided with recesses for the staircase and with holes required for the pipe shaft and other pipe passages. The recess for the staircase is provided with guide rolls engaging with the corners of the above mentioned iron structure. The outer edge of the floor slab is poured against a sheet-metal mould. Along the entire edge of the floor slab anchor irons are cast in, serving as fastenings for external wall elements to be mounted thereon later on. When the floor slabs are prepared in the manner described, lifting means are attached to each pillar which are principally constructed as shown in FIGS. 1 and 3 and which will be described in connection with FIG. 5. The said lifting means 6 are secured to the collars 9 and are preferably connected to a central apparatus which provides the motors for each lifting means with the same speed, so that the lifting occurs uniformly along the entire floor. The floor is lifted to a level somewhat above its final level. Thereafter, U-shaped iron pillars 10 are inserted from the side (see FIG. 2) and fixed in position by grooves in the collars. The floor is then lowered into its final position, whereafter the lifting means are disengaged and moved downwards by one story. The lifting means 6 are fastened in the basement such, that the rack 5 is in the hole in the foundation 3 of the basement floor and in the U-shaped pillar, the said rack being in its lowermost position.

In the same manner as for the basement ceiling, four floors 11, for example, are then cast one above the other and provided with collars 12 and stoppers 13, according to FIG. 4. The said collars 12 are secured by casting to the floors 11, the stoppers 13 extending into holes in the collars of the over- and underlying floors where they are guided, for example, by a flange. Between each floor slab is laid a layer, for example, of wood fibre. All floors are provided with cast-in bars 52 according to FIG. 22 spaced 0.5 m. in one direction of the building. The purpose of the bars will be described later on in this specification. Thereafter, the cast floors 11 (see FIG. 1) are lifted somewhat higher than one story, whereafter U-shaped pillars 10 are inserted and the floors are lowered upon the same. After the rack 5 is lowered by one story, the stoppers 13 in a floor 11 above the basement story are removed, whereafter extension rods 14 according to FIG. 7 are mounted. Such an extension rod has preferably square section of a dimension corresponding to the rack 5 without teeth and is provided at its one end with a recess 24 and at its other end with a pin 25 for guidance. Thereafter the three uppermost floors 11 are lifted by one story, and the same procedure is repeated until all floor slabs 11 are in their final positions. Thereafter, four more floors may be cast and the procedure be repeated by means of extension rods until the building comprises the intended number of stories.

When it was said above, that four floors 11 are cast at a time, this does not, of course, exclude the possibility of casting only one floor. Moreover, the number of floors being cast may be higher, if there are more powerful lifting means available. But, in respect of rationality and lifting power, four floors can be considered to be a preferable number.

When the floor slabs 11 are in their final positions, the pillars 10 are preferably secured to one another through the holes. The building may be braced laterally by tension cross-bars attached between any optional pair of pillars.

The pillars 10 are placed with varying spans on the same level so that they form substantially square or rectangular systems. In the case of wide spans, iron beams possibly may be cast in the floors between the pillars. The outermost pillars may possibly be placed in connection to an external wall to be erected. The U-shaped pillars 10 may further possibly be constructed in the form of cylinders being open at one side, which openings after the mounting of the pillars can be covered by screwing on a lid (not shown). Outside the building to be erected, a pre-fabricated elevator of conventional construction is mounted, to the side of which an iron structure comprising platforms for the unloading may be arranged such, that there is one platform for each story. In order to facilitate the transport operations, the platforms both in the said structure and in the lift cage, as well as the ground plane near the elevator should be even and horizontal. The platforms in the said structure should be arranged such, that they are in connection with the floors.

The assembly of lightweight concrete external and internal wall elements is carried out as follows. So-called sandwich elements for the external walls are delivered to the building site in crates 15 made of iron sections which are provided on their inside with protective cushions in the form of insets 16 of elastic material. The crates 15 are made of angle irons 17 placed, for example, in the corners and held together by straps 17a with clamp bolts 18, and of rubber cushions 19 placed on the corners to protect the wall elements 20 (see FIGS. 10 and 11). The elements are delivered by trucks and lifted from the trucks by a truck hoist or another smaller type of crane to the ground where the elements are placed such, that the slabs are in upright position. The crates which, for example, may comprise five wall elements are lifted upon a cart designed particularly for this purpose (see FIGS. 12 and 13), which cart will be described later on in this specification.

This cart, as well as other carts being applied in this connection, should run smoothly and are therefore provided with tires on ball bearings. By these carts, the crates 15 are delivered to the elevator platform in question, where the crates are unloaded such, that the elements 20 are delivered in upright position. The crates are returned to the factory for further use.

By means of another special cart (FIGS. 14 and 15) holding one element 20 by a clamping means and leaning the element forwardly, so that it does not strike against an over- or underlying floor, the element is delivered to its place in the construction, where it is erected outside the floor edge and fixed in position. By means of another special cart in the next higher story, which supplies concrete as well as cement mortar, the elements are fixed by casting. For the said casting of an element 20, small anchor irons 21 may be cast in the upper and lower edge of the floor, rendering an exact fit of the elements. In one of the wall elements, or in both, there may be provided a recess 22 to be filled with concrete (see FIG. 16). The transport carts may be equipped with gripping devices of alternative design for wall elements of special construction.

The same crates 15 as described above may also be used for internal wall slabs 23 of lightweight concrete, but in this case the number of elements per crate can be increased. The elements are transported to the platforms in the iron structure in the same manner as described above. In view of the shorter length of these elements however, they may possibly be transported directly onto the floors.

The transport of the elements to their places of assembly as well as their assembly is carried out by means of a special cart according to FIGS. 23 and 24, which lifts the elements in upright position a few centimeters from the floor and positions the elements by means of special laying mechanisms. Prior to this, the position of the walls was indicated by paint on the steel-ground concrete floors. By means of the lifting device mounted on the cart, the slab is lowered into position, after the contact surfaces both of the wall slab assembled previously and of the floor were coated with glue. The slab is secured at its upper edge according to FIGS. 21 and 22.

In the opening between the ceiling and the wall, preferably the ducts for the radiators and the electrical equipment etc. are drawn. All ducts and the like are supposed to be manufactured to measure and need only be fitted together on the building site. All ducts of greater diameter are drawn through the pipe shaft and should not be laid in the said opening.

All work in connection with the ceiling is carried out from carts having their platform and working table placed at suitable height. The carts may possibly be equipped with an electric motor operated by a manual control means which is arranged at suitable height. The platform may be adjustable in height, rendering it possible to use the carts in different constructions with no need of reconstructing the carts.

The partition walls are fitted tightly with the ceiling by insulating slabs, for example, of plastic-treated mineral wool glued on the walls on both sides of the wall close to the ceiling.

Apartment partition walls are constructed of double slab walls of lightweight concrete with intermediate insulating slabs of, for example, mineral wool. The doors and windows are secured to the walls by means of special fastening means which, for making them invisible, are covered by readymade strips. The opening between the window frame and the element is packed with, for example, mineral wool. The doors and windows are delivered to the building site in ready-painted state. Even the clothes-closets, cupboard arrangements etc. are delivered ready to the building site and are only to be positioned in the completed rooms. The aforesaid fastening means for windows and doors will be described later on in the specification.

The method described renders it possible to assemble the lightweight concrete elements in finished state, the elements being, for example, treated on their outside, as desired, and painted on their inside surface. All transport means are provided with protective cushions. No nailing nor boring is needed in the elements. The method described implies, of course, that all drawing and planning work must be carried out with such an accuracy and in such a detailed manner, as it was not applied heretofore.

The method includes, of course, also the possibility of using finished elements other than of lightweight concrete.

The buildings may be of any height, the expansion joints being made in conventional manner and placed at a suitable distance. There may be one or several staircases in the building. Besides the advantage of lower production costs, the method includes the further advantage of providing a flexible building, wherein all walls may be removed and replaced by other walls erected at a different place in the construction. Even the height of the stories may be changed later on. Hereby, the building is given a considerably increased life.

Having in the foregoing described the method of erecting building constructions, in the following part of the description certain detail processes will be described to a greater detail.

An internal wall slab 23 of lightweight concrete is fastened to a floor 11 as shown in FIGS. 21 and 22. The floor 11 is provided with parallel bars 52 cast in at equal spacings, the bars having trapezoidal cross-section, the smaller of their two parallel sides being open and facing downwards such, that a slot is formed in the ceiling. In the said bar is inserted a bolt 53 retained by a nut 54 having two conical sides to engage against the inner walls of the bar 52. The bolt 53 is tightened by means of a second nut 55. To the free end of the bolt 53 is attached a tightening nut 56 with an internal right-hand and left-hand thread respectively. In the other end of the nut 56 is screwed in a bolt 58 fastened to a bracket 57, the bolts 53 and 58 having a right-hand and a left-hand thread respectively, so that during the mounting operation the bracket 57 can be lifted as well as lowered. Between the bracket 57 and the wall element 23 is inserted a cushion 59, for example, of foamed plastic. After the assembly of the wall element, a sub-ceiling (not shown) is mounted in a conventional manner, which sub-ceiling is further secured in the trapezoidal bar 52 by means of special holders.

In the foregoing part of the specification was described a method of securing external wall elements 20 to the floors 11, reference being had to FIG. 16.

FIGS. 17 and 18 show how the said wall elements can be secured in an alternative manner. This alternative embodiment differs from the first-mentioned one in that the wall elements 20 are connected by projecting irons to the floors 11 by means of a completing casting. In this method, bolts 60 are cast in the floor 11. After the floor is positioned and a wall element 20 is erected in its position at the external wall, the element is secured in position by a Z-shaped iron section 61. When the groove 62 in the wall element 20 is being filled with cement mortar, reinforcement irons 63 are inserted in the joints between the wall elements located above and below. Prior to this, the wall element located above must have been positioned. The insulating layer 64 between the lightweight concrete in the external wall elements 20 is interrupted in view of the fire risk in the one short end of the wall element. This interruption is effected by the insertion of a lightweight concrete block 65, which insertion is carried out by the manufacturer of the wall elements 20.

The advantage of this method lies in the accuracy of the construction and in the simplification of the assembly work.

FIG. 19 shows the method of mounting elements 66 above windows. The fastening at the ends of the window elements occurs in the same manner as shown in FIGS. 17 and 18, but the window elements are suspended at a distance of about ½ m. from their ends in the manner as follows. The floor includes a cast-in bolt 67 of a length extending to about the centre of the insulating layer 64, where a T-shaped member 69 of flat iron which was rigidly attached to the element 66 during the manufacture of the same is thread on the bolt 67 and secured by nuts 68. To the lower side of the element 66 the window frame 70 is fastened in known manner.

FIG. 20 shows the fastening of a window frame 70 in a wall element 20. To a yoke-shaped holder 71 pressed into the wall element a clamp screw 72 is rigidly secured, by means of which screw the window frame 70 can be adjusted. The opening between the frame 70 and the holder 71 is filled with insulating material 73 covered by ledges 74.

The door frames according to FIG. 25 are mounted in an analogous manner, the holder 71 having been replaced by a holder 75 of U-shape, which engages with its shanks to the internal wall element 23. The clamp screw is designated by 76, the insulation by 77, the door frame by 78, the jamb lining holding the frame by 79 and the door by 80.

FIGS. 26 and 27 show a method for mounting balconies. The balconies are preferably delivered ready for mounting, in order to render their mounting possible without disturbing the rational erection method of the construction as a whole. The subject matter of this invention refers also to a method of mounting balconies without affecting the insulation in the external walls. In connection with the casting of the floor slab 11, preferably I-beams 81 are fastened on edge. The balcony slabs 82 are cast to include corresponding rectangular holes 83, rendering it possible to thread them onto the said I-beams 81 from the outside. The balcony slab 82 should preferably have a total thickness less than that of the floor 11, so that it can be threaded onto the I-beam 81 prior to the lifting of the floor 11. The slabs 82 are not threaded on so far that they contact the floor 11, but such that there is left space between the slab 82 and the floor for mounting the wall elements 20. First after the wall elements 20 are mounted, an insulating layer 84 is placed between the wall and the balcony slab 82, whereafter the said slab is brought into contact with the wall and secured at the outer end by a washer 85 and a screw 86. Thereafter the recesses 87 for the washer and the screw in the slab 82 are filled with cement mortar.

FIG. 8 shows a method of guiding floors 8, 11 while being lifted in holes left for the staircase. According to this method, an upright L-shaped iron beam 88 is secured in each corner of the staircase structure, the floor 11 being provided with recesses 89, 90 located at an angle to one another. A reinforcing iron 91 with a yoke is cast in the floor 11 in the centre of the recess, in which yoke adjustable rotary guide wheels 92 are mounted.

FIG. 9 shows an alternative embodiment of guiding the floor slabs during their lifting along the staircase structure. From a practical point of view, it may be suitable to divide the floor slabs 8, 11 by a plurality of expansion joints, each portion being lifted separately. For the first portions to be lifted, double-acting guide wheels 93 are fastened in cut-in guides 94 in three points, and an outward guide wheel 95 is fastened in one point in a manner shown in FIG. 8. One of the guide wheels 93 is retained in a guiding position 96 on the uppermost floor, as appears from FIG. 9. Hereby, the floor is safely guided until it has reached its final position and the pillars 10 are mounted, cross-bars being inserted between optional pillars in each story. The floor portions to be lifted thereafter do not require the guide structure 96 which would only hinder the work. These floor portions may be guided during their lifting by the pillars already mounted.

Having described the method and the means applied for carrying out the method, the means will now be described in a greater detail.

The lifting means according to FIGS. 5 and 6 may be lift jacks of conventional type, possibly modified, or they may be of a construction shown in FIGS. 5 and 6 comprising a casing 26 enclosing a worm 27, a worm wheel 28 and a tooth wheel 29 actuating the rack 5 which is axially displaceable through the casing 26. The lifting means can be operated in any known manner.

The cart according to FIGS. 12 and 13 is, as already mentioned, intended for transporting a crate with wall elements according to FIGS. 10 and 11 to their place of assembly, and comprises a frame 30 with wheels 31. A crate 15 is held on a stand 32 by means of a holder 33 which can be folded over the crate 15 by a hinge 34. The stand is pivoted on the frame about a hinge 35, so that by means of a screw 37 arranged on an upright 36 the crate 15 can be tipped into the desired angular position.

The cart according to FIGS. 14 and 15 is adapted to transport single elements 20 to their place of assembly and comprises a wheeled chassis of two frames 38, 39 pivoted vertically to one another, the upper frame including an upright 40 and a screw 41, by means of which the upper frame 38 is manually elevated and lowered in relation to the lower frame 39 for obtaining different angular positions. The wall element 20 is fastened on a yoke 44 pivotable in the vertical plane by means of a screw 42 at an axle 43 such that, the inclination of the wall element is adjusted by the screw 42. The element 20 is maintained in position by a screw means 45 and protected against damages by inserted rubber cushions 46 or the like. The cart is preferably equipped with a counterweight 47.

As mentioned before, the cart according to FIGS. 23 and 24 is intended for the transport of internal wall slabs 23 of lightweight concrete and comprises a wheeled frame 48 carrying an upright 49 provided with a holding and lifting means 50 with screw. Even in this case, the cart is provided both with inserted rubber cushions 51 for protecting the wall slabs 23, and with a counterweight.

What I claim is:

1. A method for the lifting of floors during the erection of prefabricated buildings comprising forming a foundation floor, providing said foundation floor with means defining a plurality of recesses each having a depth greater than the distance between the upper surfaces of adjacent floors when said adjacent floors are at their final levels, forming a first floor on said foundation floor, providing said first floor with means defining a plurality of cavities aligned with said recesses in said foundation floor, providing stopping elements in engagement with said means defining said recesses thereby closing said recesses, providing a plurality of lifting means each including a body portion and a lifting rod, said body portion and lifting rod of each lifting means being movable relative to each other, securing said body portions to the upper surface of said first floor and moving said lifting rods downwardly relative thereto to extend the same through said cavities into engagement with said stopping elements, continuing to move said lifting rods downwardly relative to said body portions and against said stopping elements to raise said first floor to a height greater than the final level of said first floor, positioning a plurality of vertically extending supporting elements on said foundation floor between said foundation floor and the raised first floor, moving said lifting rods upwardly relative to said body portions to lower said raised first floor into engagement with said supporting elements, continuing to move said lifting rods upwardly relative to said body portions to withdraw said lifting rods through said cavities, removing said stopping elements from said recesses in said foundation floor, repositioning said body portions of said lifting means on said foundation floor with the lower ends of said lifting rods extending into said recesses, attaching extension rods to the upper ends of said lifting rods to increase the length of said lifting rods by a distance approximately equal to the distance between the upper surfaces of adjacent floors when said adjacent floors are at their final levels, forming a plurality of superimposed additional floors on the supported first floor, providing each of said additional floors with means defining a plurality of cavities aligned with said cavities in said first floor, providing additional stopping elements in engagement with the underside of said means defining each of said cavities in said additional floors to thereby close each of said cavities, moving the extended lifting rods upwardly relative to said body portions to pass the same through said cavities in said first floor into engagement with said additional stopping elements in said cavities of the lowermost additional floor, continuing to move said lifting rods upwardly relative to said body portions and against said additional stopping elements in said lowermost additional floor to raise said plurality of additional floors to a height greater than the final level of said lowermost additional floor, positioning a plurality of additional vertically extending supporting elements on said first floor between said first floor and the raised lowermost additional floor, moving said lifting rods downwardly relative to said body portions to lower the plurality of raised additional floors into engagement with said additional supporting elements, continuing to move said lifting rods downwardly relative to said body portions to lower the same into said recesses, removing said additional stopping elements in said lowermost additional floor, and repeating the steps of attaching additional extension rods to said lifting rods, moving said extended lifting rods upwardly relative to said body portions to pass the same through cavities in the supported first and additional floors into engagement with additional stopping elements in the lowermost unsupported additional floor, continuing to move said extended lifting rods upwardly relative to said body portions and against said additional stopping elements in said lowermost unsupported additional floor to raise the remaining unsupported additional floors to a height greater than the final level of said lowermost unsupported additional floor, positioning a plurality of additional supporting elements on the uppermost supported floor between said uppermost supported floor and said lowermost unsupported floor, moving said extended lifting rods downwardly relative to said body portion to lower said remaining unsupported additional floors into engagement with said additional supporting elements, continuing to move said extended lifting rods downwardly relative to said body portions to lower the same into said recesses, and removing the last-mentioned additional stopping elements, until all of said additional floors are at their final levels.

2. The method according to claim 1 including the step of forming at least four superimposed additional floors on said supported first floor.

3. The method of claim 1 further including the step of forming another plurality of superimposed additional floors on the uppermost of said first-mentioned plurality of additional floors after all of said first-mentioned additional floors are at their final level, and repeating the necessary steps to raise said last-mentioned plurality of additional floors to their final level.

4. The method of claim 1 including the steps of casting said first floor on said foundation floor with the upper surface of said foundation floor serving as a support for said first floor, and casting said plurality of additional floors on said supported first floor with the upper surface of said first floor serving as a support for said lowermost additional floor and the upper surface of each additional floor serving as a support for the next higher additional floor.

References Cited by the Examiner

UNITED STATES PATENTS

| 786,706 | 4/05 | Wustner | 254—96 |
| 1,010,774 | 12/11 | Lange | 254—96 |
| 2,828,030 | 3/58 | Harrington et al. | 214—130 |
| 2,867,111 | 1/59 | Youtz | 50—80 |
| 2,873,024 | 2/59 | Koester | 206—62 |
| 2,874,860 | 2/59 | King | 214—130 |
| 2,975,560 | 3/61 | Leonard | 50—80 |
| 2,990,058 | 6/61 | Williams | 206—62 |
| 3,040,411 | 6/62 | Messenger | 50—80 X |
| 3,052,449 | 9/62 | Long et al. | 50—80 X |

FOREIGN PATENTS

| 138,865 | 10/50 | Australia. |
| 1,108,787 | 9/55 | France. |
| 1,109,975 | 10/55 | France. |
| 597,687 | 2/48 | Great Britain. |
| 613,403 | 11/48 | Great Britain. |

JACOB L. NACKENOFF, *Primary Examiner.*

WILLIAM I. MUSHAKE, *Examiner.*